(12) United States Patent
Toya et al.

(10) Patent No.: US 11,251,568 B2
(45) Date of Patent: Feb. 15, 2022

(54) STORAGE BATTERY UNIT AND CONNECTOR THAT CAN BE CONNECTED TO EACH OTHER

(71) Applicant: Panasonic Intellectual Property Management Co., Ltd., Osaka (JP)

(72) Inventors: Shoichi Toya, Hyogo (JP); Takeshi Nakashima, Hyogo (JP); Yohei Yamada, Hyogo (JP); Chie Kashiki, Osaka (JP); Yoshikatsu Ito, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 113 days.

(21) Appl. No.: 16/627,754

(22) PCT Filed: May 14, 2018

(86) PCT No.: PCT/JP2018/018577
§ 371 (c)(1),
(2) Date: Dec. 30, 2019

(87) PCT Pub. No.: WO2019/008905
PCT Pub. Date: Jan. 10, 2019

(65) Prior Publication Data
US 2021/0167552 A1    Jun. 3, 2021

(30) Foreign Application Priority Data

Jul. 5, 2017 (JP) ............... JP2017-131876

(51) Int. Cl.
*H01R 13/639* (2006.01)
*H01M 50/547* (2021.01)
(Continued)

(52) U.S. Cl.
CPC ........ *H01R 13/639* (2013.01); *H01M 10/425* (2013.01); *H01M 50/547* (2021.01); *H01R 13/70* (2013.01)

(58) Field of Classification Search
CPC ... H01R 13/639; H01R 13/70; H01M 50/547; H01M 10/425
See application file for complete search history.

(56) References Cited

U.S. PATENT DOCUMENTS 9,509,156 B2 * 11/2016 Takao ............... H01M 10/42
9,615,414 B2 *  4/2017 Hamamoto .......... H05B 45/00
(Continued)

FOREIGN PATENT DOCUMENTS

WO    2016/157740 A1    10/2016

OTHER PUBLICATIONS

Extended European Search Report issued in corresponding European Patent Application No. 18828018.4, dated Jun. 12, 2020.
(Continued)

*Primary Examiner* — Abdullah A Riyami
*Assistant Examiner* — Nader J Alhawamdeh
(74) *Attorney, Agent, or Firm* — McDermott Will & Emery LLP

(57) ABSTRACT

A first connector for electrically connecting a first unit power terminal through a third unit power terminal to a power converter for performing conversion between a DC power and an AC power is mounted to a mounting port. In a status in which the first connector is being removed from the mounting port, it is impossible to mount the first connector to the mounting port while the first unit power terminal through the third unit power terminal are inputting and outputting a DC power, and it is possible to mount the first connector to the mounting port while the first unit power (Continued)

terminal through the third unit power terminal are not inputting and outputting a DC power.

4 Claims, 13 Drawing Sheets

(51) Int. Cl.
*H01M 10/42* (2006.01)
*H01R 13/70* (2006.01)

(56) References Cited

U.S. PATENT DOCUMENTS

2014/0191705 A1* 7/2014 Takao .................. H02J 7/0068
320/103
2021/0167552 A1* 6/2021 Toya ................... H01M 50/547

OTHER PUBLICATIONS

International Search Report issued in corresponding International Patent Application No. PCT/JP2018/018577, dated Jul. 10, 2018, with English translation.

* cited by examiner

100

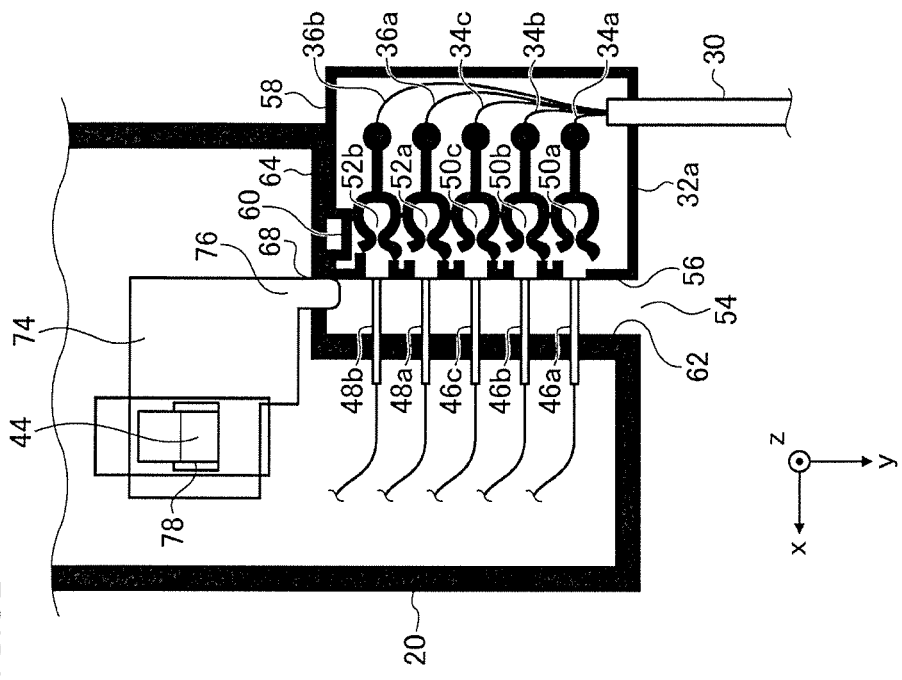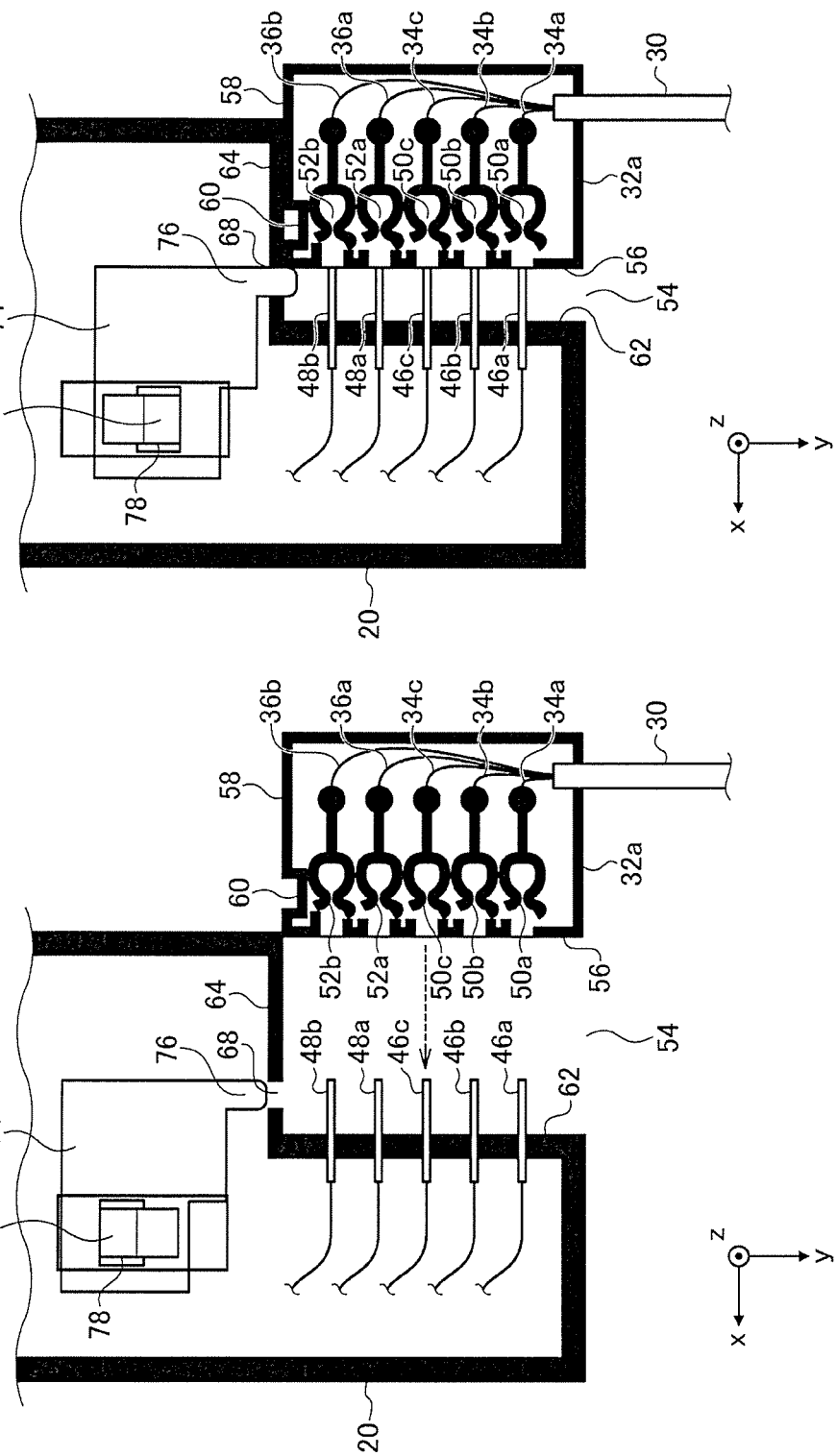

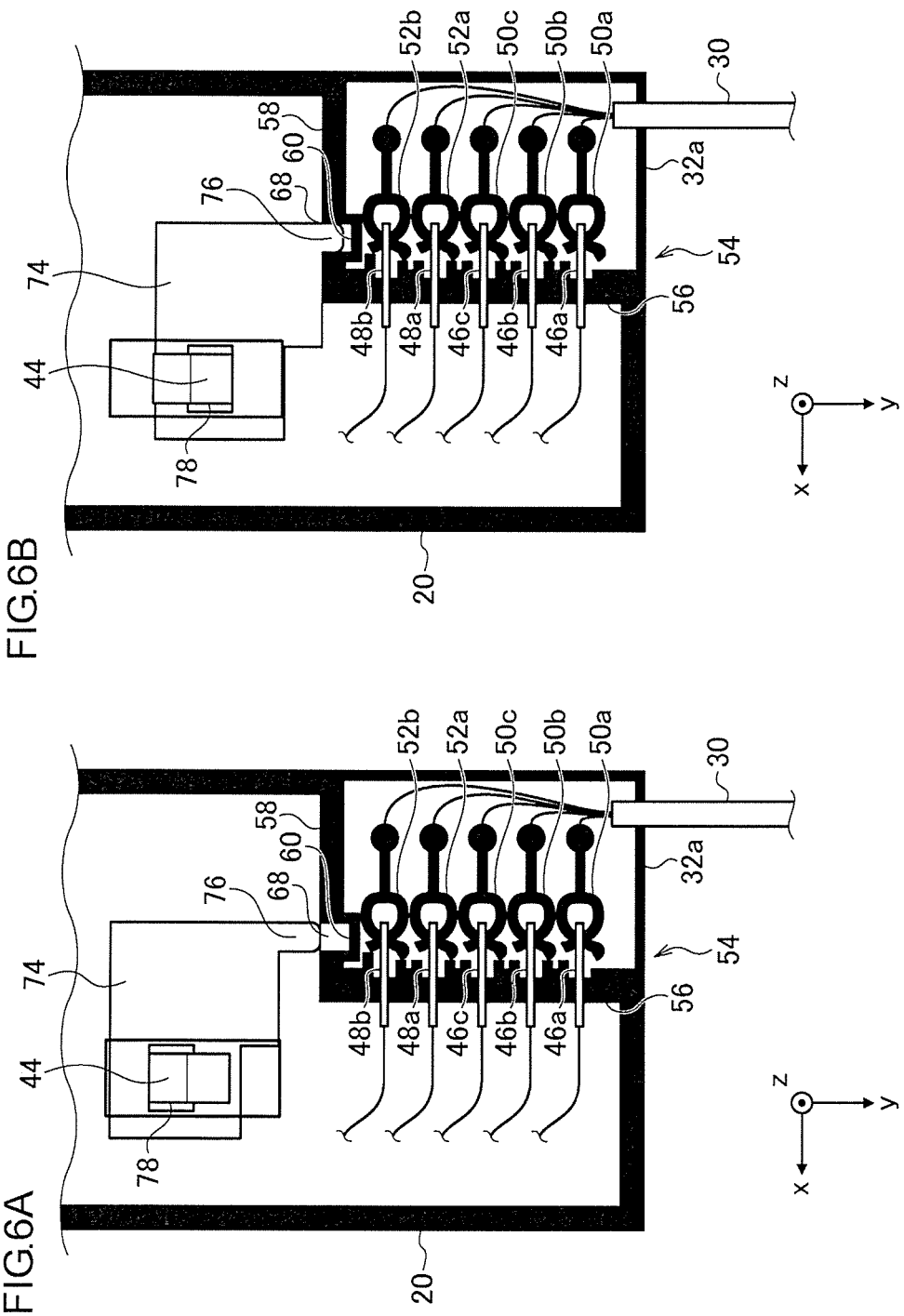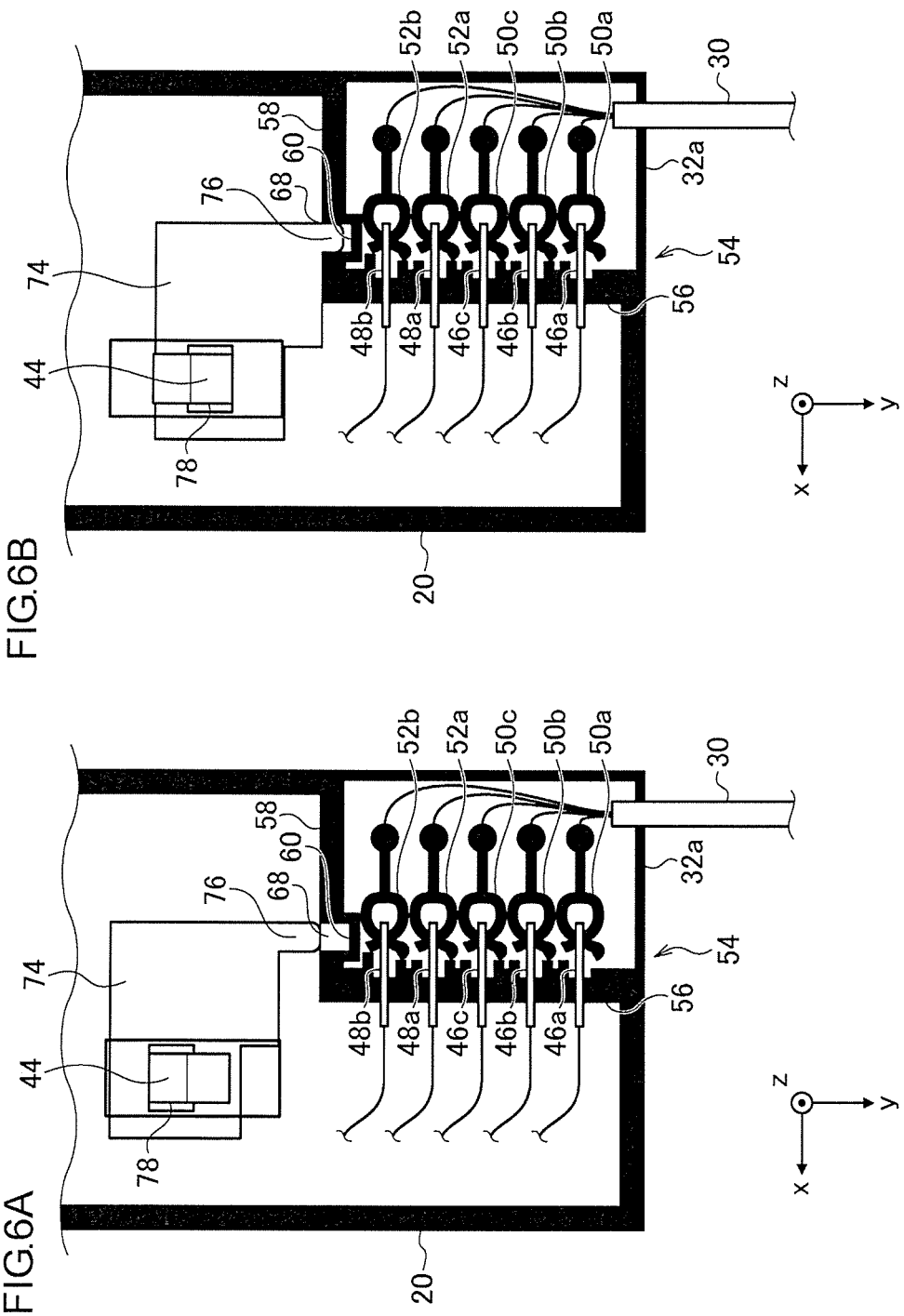

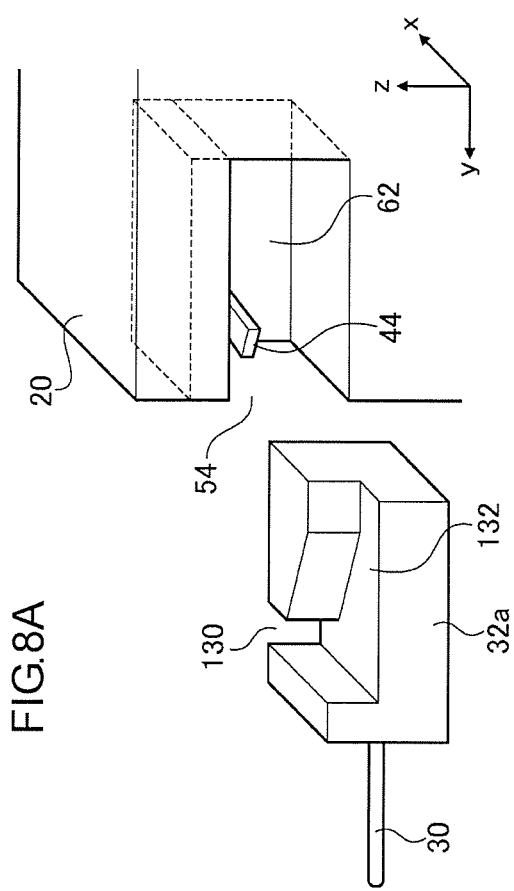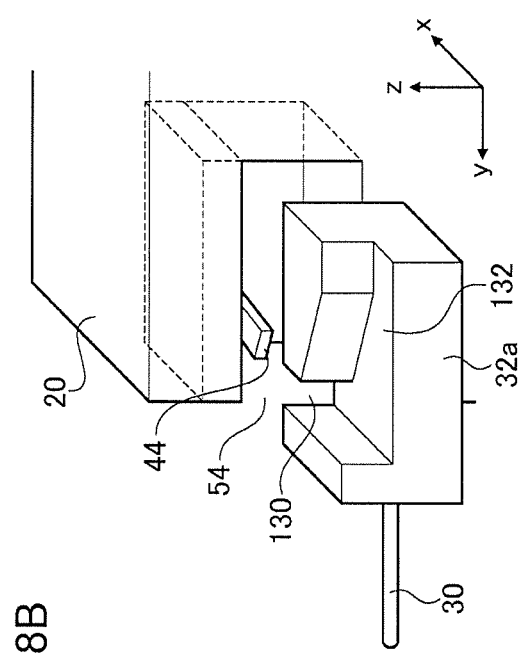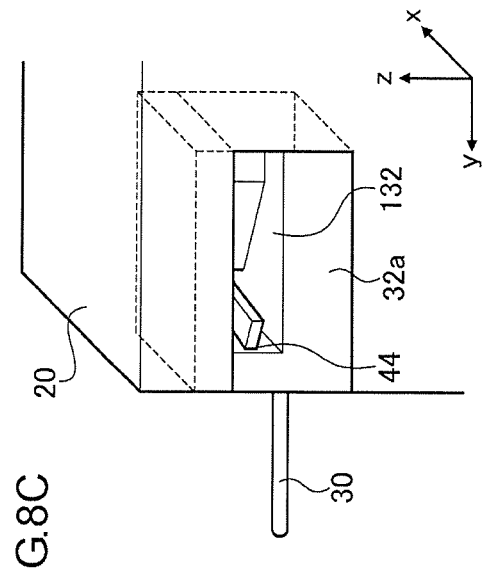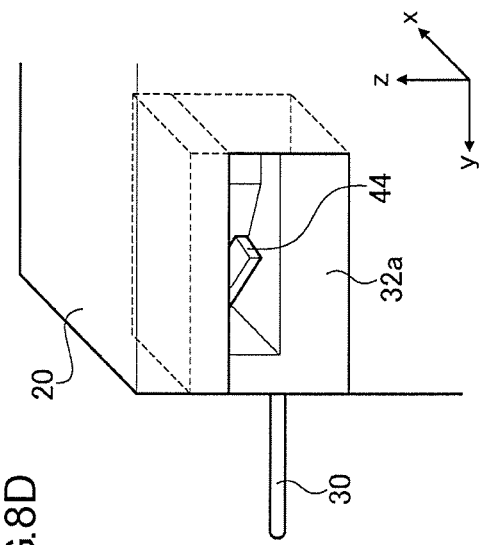

STORAGE BATTERY UNIT AND CONNECTOR THAT CAN BE CONNECTED TO EACH OTHER

CROSS-REFERENCE OF RELATED APPLICATIONS

This application is the U.S. National Phase under 35 U.S.C. § 371 of International Patent Application No. PCT/JP2018/018577, filed on May 14, 2018, which in turn claims the benefit of Japanese Patent Application No. 2017-131876, filed on Jul. 5, 2017, the entire disclosures of which Applications are incorporated by reference herein.

BACKGROUND

1. Field

The present disclosure relates to storage battery units and connectors and, more particularly, to a storage battery unit and a connector that can be connected to each other.

2. Description of the Related Art

A storage battery unit installed in a facility such as a house is connected to a power conditioner, and the power conditioner is connected to a commercial power supply. The power conditioner uses power supplied from the commercial power supply and controls the charging and discharging of the storage battery provided in the storage battery unit (see, for example, WO16/157740).

SUMMARY

To install a storage battery unit, it has been necessary to have an electrician visit the facility to connect the storage battery unit and the power conditioner electrically in an electrical work to work with terminals etc.

The disclosure addresses the above-described issue, and a general purpose thereof is to provide a technology of simplifying installation of a storage battery unit.

A storage battery unit according to an embodiment of the present disclosure includes: a storage battery; a unit power terminal that inputs and outputs a DC power of the storage battery; and a mounting port in which a connector is mounted, the connector being configured to electrically connect the unit power terminal and an external power converter for performing conversion between a DC power and an AC power, the connector also including a connector power terminal connected to the unit power terminal. In a status in which the connector is being removed from the mounting port, it is impossible to mount the connector to the mounting port while the unit power terminal is inputting and outputting a DC power, and it is possible to mount the connector to the mounting port while the unit power terminal is not inputting and outputting a DC power.

BRIEF DESCRIPTION OF DRAWINGS

The figures depict one or more implementations in accordance with the present teaching, by way of example only, not by way of limitations. In the figures, like reference numerals refer to the same or similar elements.

FIGS. 5A and 5B are exploded top views showing mounting and removal of the first connector in the storage battery unit of FIGS. 4A and 4B;

FIGS. 6A and 6B are alternative exploded top views showing mounting and removal of the first connector in the storage battery unit of FIGS. 4A and 4B;

FIGS. 8A, 8B, 8C, and 8D are alternative perspective views showing mounting and removal of the first connector in the storage battery according to embodiment 2;

DETAILED DESCRIPTION

Figure 1:
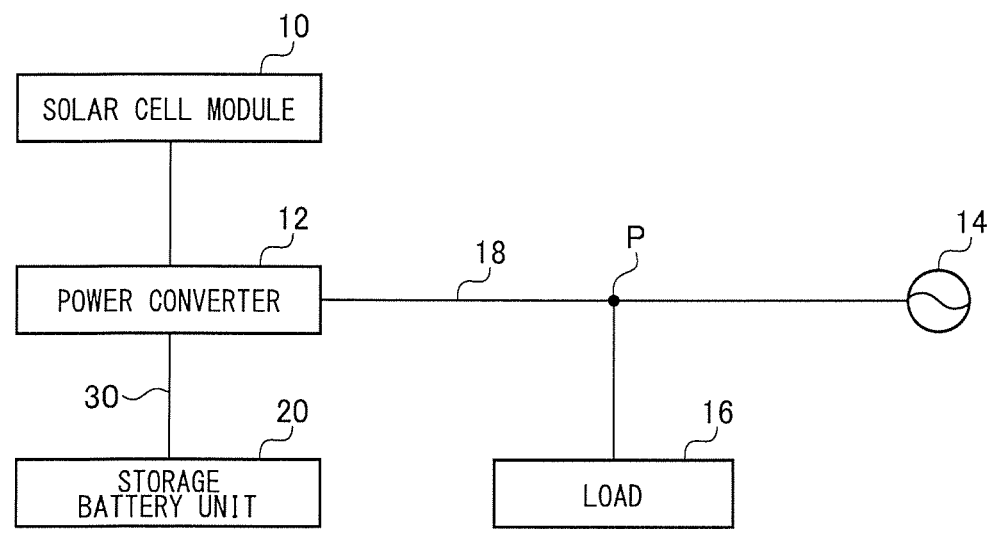
FIG. 1 shows a configuration of a power distribution system according to embodiment 1.

The invention will now be described by reference to the preferred embodiments. This does not intend to limit the scope of the present invention, but to exemplify the invention.

Embodiment 1

The knowledge that provides the basis of an embodiment of the present disclosure will be discussed before discussing the embodiment in specific details. The embodiment relates to a power distribution system connected to a power system (a commercial power supply) and capable of supplying power to a load such as a home electric appliance, etc. in a facility. The power distribution system includes a power conditioner, i.e., a power converter, connected to a storage battery unit. Conventionally, an electrician visiting the facility has performed an electrical work to work with terminals etc. to install the storage battery unit in the facility and connect the storage battery unit and the power converter electrically.

In this background, it is desirable for residents, manager, etc. of the facility to make a visit of an electrician unnecessary and simplify the connection between the storage battery unit and the power converter. Further, the lid, etc. of the storage battery unit is opened in an electrical work to work with terminals, etc., but, considering the warranty on the storage battery unit, it is desired to leave the lid unopened and simplify the connection between the storage battery unit and a power converter. For simplified connection between the storage battery unit and the power converter, a connector such as the one used to supply power to home electric appliances may be used. Unlike the case of home electric appliances to which an AC power is supplied, however, a DC power is input and output between the storage battery unit and the power converter. Therefore, measures should be taken to secure safety even in the case of using a connector. Another concern is that, since a DC power is input and output between the storage battery unit and the power converter, electrons will move in one direction when a spark is produced between terminals at the time of establishing connection, with the result that the terminals are degraded easily. This concern should also be taken into consideration in securing safety.

The following structure or configuration is called for between the storage battery unit and the connector in order to secure the required safety.

(1) When the connector is mounted to the storage battery unit, the circuit of the storage battery unit is in a cut-off status, i.e., input and output of a DC power should be disabled.

(2) While a DC power is being input and output in the storage battery unit, the connector cannot be removed from the storage battery unit.

(3) While a DC power is not being input and output in the storage battery unit, the connector can be removed from the storage battery unit.

The terms "parallel" and "perpendicular" in the following description not only encompass completely parallel or perpendicular but also encompass off-parallel and off-perpendicular within the margin of error. The term "substantially" means identical within certain limits.

FIG. 1 shows a configuration of a power distribution system 100. The power distribution system 100 includes a solar cell module 10, a power converter 12, a power system 14, a load 16, a power distribution line 18, and a storage battery unit 20. A cable 30 is provided between the power converter 12 and the storage battery unit 20.

The power system 14 is a commercial power supply and supplies an AC power. The solar cell module 10 is a renewable energy generation apparatus. The solar cell module 10 uses photovoltaic effect to convert light energy into electric power directly. A silicon solar cell, a solar cell made of a compound semiconductor, etc., a dye-sensitized solar cell (organic solar cell) or the like is used as the solar cell. Instead of the solar cell module 10, other renewable energy electrical generators may be used. For example, a fuel cell system may be used. The solar cell module 10 is connected to the power converter 12 and outputs the generated DC power to the power converter 12. The storage battery unit 20 includes a storage battery capable of charging and discharging power, and the storage battery is exemplified by a lithium ion storage battery, a nickel hydride storage battery, a lead storage battery, an electric double layer capacitor, a lithium ion capacitor, or the like. The storage battery unit 20 is connected to the power converter 12 via the cable 30.

The power converter 12 is connected to the power system 14 via the power distribution line 18 and is also connected to the solar cell module 10 and the storage battery unit 20. The power converter 12 is a bidirectional DC/AC inverter 22 and converts the AC power from the power distribution line 18, i.e., the AC power from the power system 14 into a DC power and outputs the converted DC power to the storage battery unit 20. The power converter 12 also converts the DC power from the storage battery unit 20 into an AC power and outputs the converted AC power to the power distribution line 18. In other words, the storage battery unit 20 is charged and discharged by the power converter 12. The power converter 12 also converts the DC power from the solar cell module 10 into an AC power and outputs the converted AC power to the power distribution line 18. In particular, the power converter 12 outputs an AC power of a frequency synchronized with the frequency of the AC power in the power system 14. In this way, the power converter 12 performs conversion between the DC power and the AC power.

The power distribution line 18 connects the power converter 12 and the power system 14. The load 16 is connected to branch from a node P between the power converter 12 and the power system 14. For example, a power distribution board is installed at the node P. The power distribution board distributes the AC power from the power system 14 to the respective equipment. The load 16 is equipment that consumes power supplied via the power distribution line 18. The load 16 encompasses equipment such as a refrigerator, an air conditioner, and illumination. The figure shows one load 16 connected, but a plurality of loads 16 may be connected.

Figure 2:
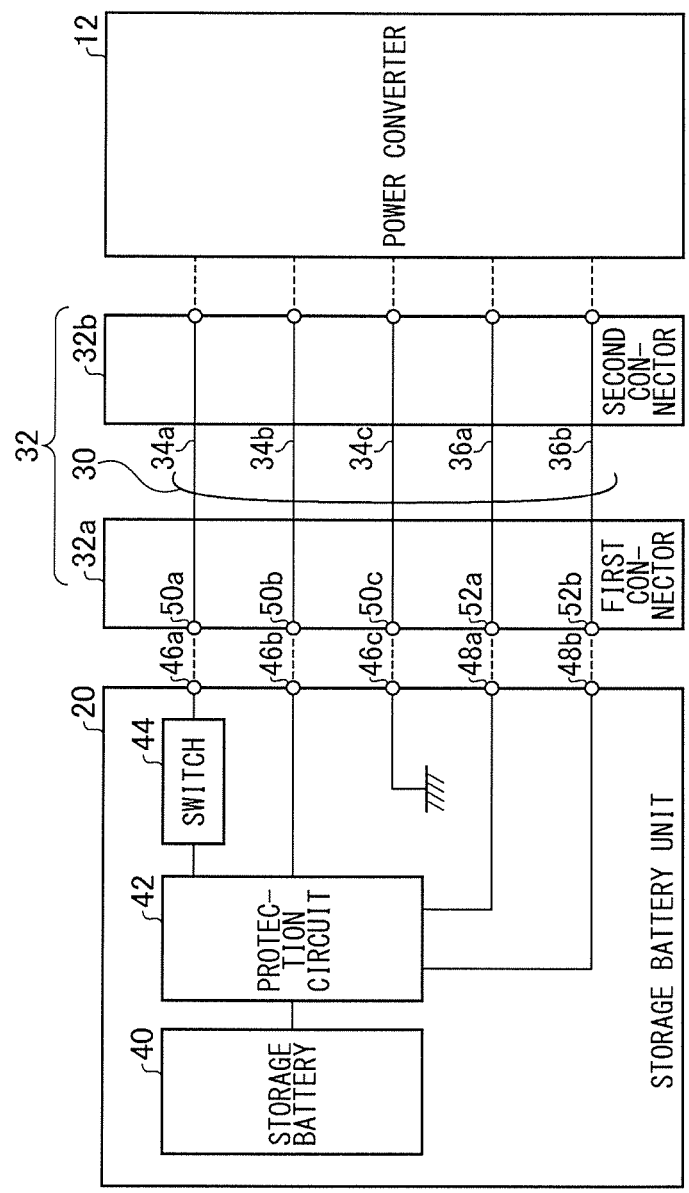
FIG. 2 shows wiring in the storage battery unit, a connector, and the power converter of FIG. 1.

FIG. 2 shows wiring in the storage battery unit 20, a connector 32, and the power converter 12. The storage battery unit 20 includes a storage battery 40, a protection circuit 42, a switch 44, a first unit power terminal 46a, a second unit power terminal 46b, a third unit power terminal 46c, which are generically referred to as unit power terminals 46, a first unit communication terminal 48a, and a second unit communication terminal 48b, which are generically referred to as unit communication terminals 48. The connector 32 includes a first connector 32a, a second connector 32b, and a cable 30. The cable 30 includes a first power line 34a, a second power line 34b, a third power line 34c, which are generically referred to as power lines 34, a first communication line 36a, and a second communication line 36b, which are generically referred to as communication lines 36. Further, the first connector 32a includes a first connector power terminal 50a, a second connector power terminal 50b, a third connector power terminal 50c, which are generically referred to as connector power terminals 50, a first connector communication terminal 52a, and a second connector communication terminal 52b, which are generically referred to as connector communication terminals 52.

For example, the storage battery 40 is comprised of a plurality of cells connected in series. The cell is, for example, a lithium ion battery. The total of the voltages across the terminals of the plurality of cells is the voltage value of the DC power that the storage battery 40 is capable of outputting. The protection circuit 42 is a circuit for protecting the storage battery 40. More specifically, the protection circuit 42 outputs the temperature, voltage value, current value of the storage battery 40 to the power converter 12 via the unit communication terminals 48 or cuts off the current supplied from the storage battery 40 in the event that an abnormality occurs. The unit power terminals 46 are terminals via which the DC power of the storage battery 40 can be input and output. The first unit power terminal 46a is a "+" terminal, the second unit power terminal 46b is a "−" terminal, and the third unit power terminal 46c is a "ground" terminal.

The first unit power terminal 46a is connected to the storage battery 40 via the switch 44. The switch 44 is a component for switching between enabling the input and output of the DC power to and from the storage battery 40 and disabling the input and output of the DC power. The switch 44 corresponds to a switch of a breaker. When the switch 44 is turned on, the input and output of the DC power is enabled. When the switch 44 is turned off, the input and output of the DC power is disabled. The second unit power terminal 46b is connected to the protection circuit 42, and the third unit power terminal 46c is connected to the ground. The first unit communication terminal 48a and the second unit communication terminal 48b are terminals where a signal for communication with the power converter 12 is input and output. The first unit communication terminal 48a and the second unit communication terminal 48b are connected to the protection circuit 42.

The first connector 32a is provided at one end of the cable 30, and the second connector 32b is provided at the other end. Hereinafter, the connector that should be connected to the storage battery unit 20 will be defined as the first connector 32a, and the connector that should be connected to a component other than the storage battery unit 20 (e.g., the power converter 12) is defined as the second connector 32b. The first connector power terminal 50a can be connected to the first unit power terminal 46a, the second connector power terminal 50b can be connected to the second unit power terminal 46b, and the third connector power terminal 50c can be connected to the third unit power terminal 46c. Further, the first connector communication terminal 52a can be connected to the first unit communication terminal 48a, and the second connector communication terminal 52b can be connected to the second unit communication terminal 48b.

The second connector 32b also includes terminals like the connector power terminals 50 and the connector communication terminals 52, but a description thereof is omitted. Those terminals can be connected to the terminals of the power converter 12. The first power line 34a is connected to the first connector power terminal 50a, the second power line 34b is connected to the second connector power terminal 50b, and the third power line 34c is connected to the third connector power terminal 50c. The power lines 34 electrically connect between the storage battery unit 20 and the power converter 12 to transfer a DC power. Further, the first communication line 36a is connected to the first connector communication terminal 52a, and the second communication line 36b is connected to the second connector communication terminal 52b. The communication lines 36 transfer a signal between the storage battery unit 20 and the power converter 12.

Figure 3A:
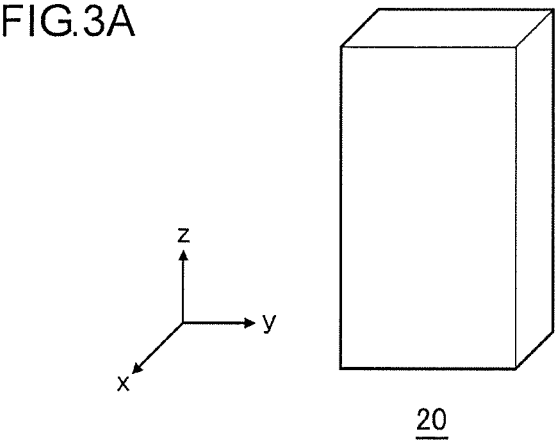
FIGS. 3A, 3B and 3C show a structure of the storage battery unit and the connector of FIG. 1.
Figure 3B:
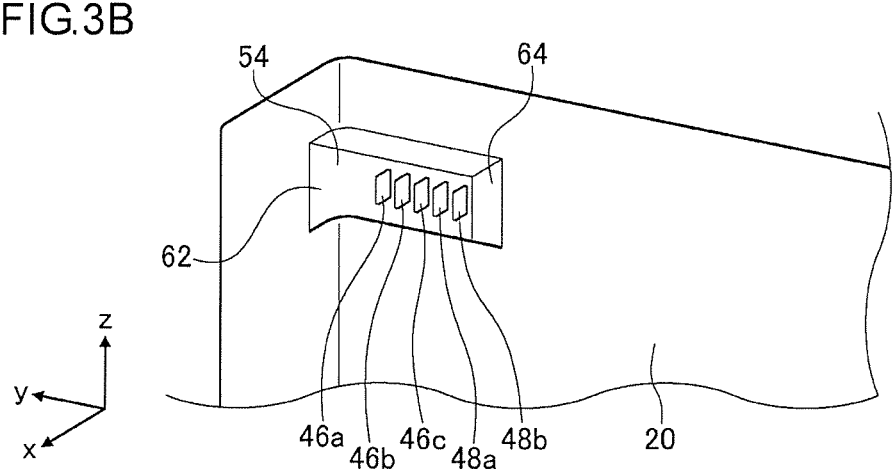
Figure 3C:
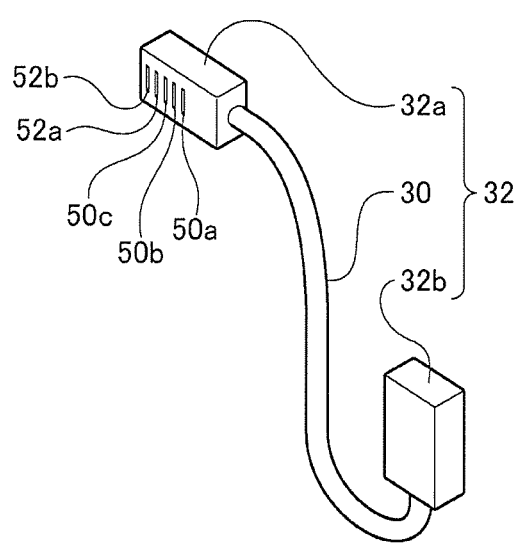

FIGS. 3A-3C show a structure of the storage battery unit 20 and the connector 32. FIG. 3A is a front perspective view of the storage battery unit 20, FIG. 3B is a rear perspective view of the storage battery unit 20, and FIG. 3C shows a structure of the connector 32. As shown in FIGS. 3A-3B, an orthogonal coordinate system including the x axis, the y axis, and the z axis is defined. The x axis and the y axis are orthogonal to each other within the ceiling surface or the bottom surface of the storage battery unit 20. The z axis is perpendicular to the x axis and the y axis and extends in the height (perpendicular) direction of the storage battery unit 20. The positive direction of each of the x axis, the y axis, and the z axis is defined in the direction of arrow in FIGS. 3A-3B, and the negative direction is defined in the direction opposite to the direction of arrow. The positive direction side along the x axis may be referred to as "front side" or "frontal side", the negative direction side along the x axis may be referred to as "back side" or "back surface side", the positive direction side along the z axis may be referred to as "top side" or "ceiling surface side", and the negative direction side along the z axis may be referred to as "lower side" or "bottom surface side". Further, the y axis direction may be referred to as "side surface side".

The storage battery unit 20 has a box shape elongated in the direction of height. A mounting port 54 having a recessed shape is formed toward the topmost parts of the back surface and of the surface on the positive direction side along the y axis of the storage battery unit 20. A first port surface 62 facing the space behind and a second port surface 64 facing the positive direction side along the y axis are provided in the mounting port 54 so as to be continuous with each other. The unit power terminals 46 and the unit communication terminals 48 are provided on the first port surface 62.

The first connector 32a provided at one end of the cable 30 has a box shape. The first connector 32a can be said to be a housing and houses the connector power terminals 50 and the connector communication terminals 52 on one surface thereof. The first connector 32a is mounted to the mounting port 54 such that the surface provided with the connector power terminals 50 and the connector communication terminals 52 face the first port surface 62. For this reason, the size of the first connector 32a is configured to be equal to or smaller than the size of the mounting port 54. By mounting the first connector 32a to the mounting port 54 in this way, the unit power terminals 46 and the connector power terminals 50 are electrically connected.

Figure 4B:
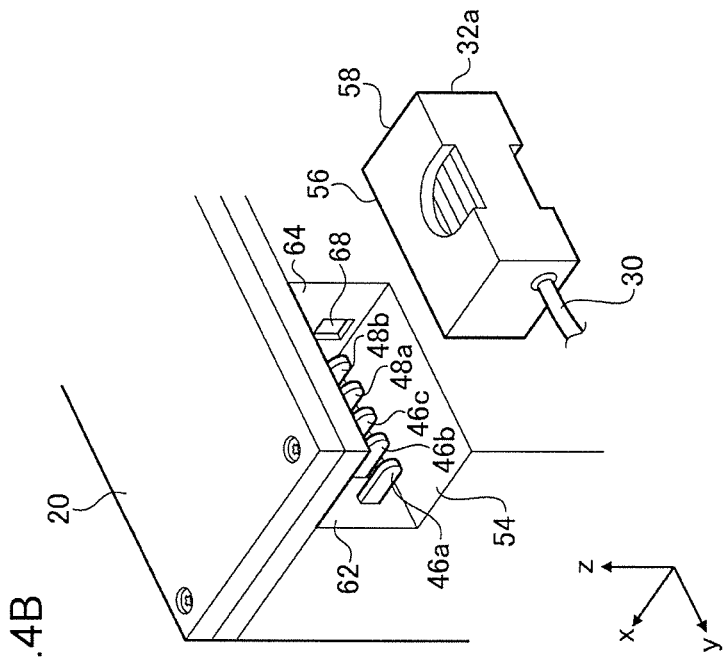
FIGS. 4A and 4B are perspective views showing a structure of the storage battery unit and the first connector of FIGS. 3A-3C.
Figure 4A:
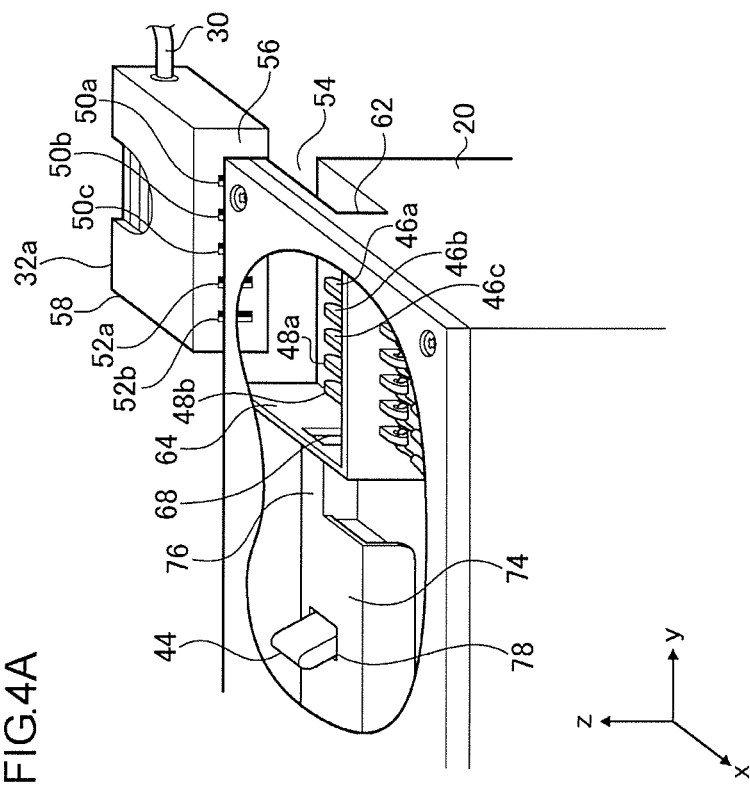

FIGS. 4A-4B are perspective views showing a structure of the storage battery unit 20 and the first connector 32a. FIG. 4A is a front perspective view of the storage battery unit 20 and shows the ceiling surface as being transparent to show the internal structure. FIG. 4b is a rear perspective view of the storage battery unit 20. These views show a status occurring immediately before the first connector 32a is mounted to the mounting port 54 or immediately after the first connector 32a is removed from the mounting port 54. A first connector surface 56 is provided on the front side of the first connector 32a. The connector power terminals 50 and the connector communication terminals 52 are arranged on the first connector surface 56 in the y axis direction. Further, a second connector surface 58 is provided to the side of the first connector surface 56 on the negative direction side along the y axis.

As is also shown in FIG. 3B, the first port surface 62 and the second port surface 64 are provided in the storage battery unit 20. In other words, the first port surface 62 faces the first connector surface 56, and the second port surface 64 faces the second connector surface 58. The unit power terminals 46 and the unit communication terminals 48 are arranged on the first port surface 62 in the y axis direction. A hole 68 is provided in the second port surface 64. A movable piece projection 76 is configured to project from the hole 68 toward the mounting port 54. The movable piece projection 76 projects in a movable piece 74 provided on the negative direction side of the second port surface 64 along the y axis toward the positive direction side along the y axis. A movable piece opening 78 is provided in the movable piece 74, and a switch 44 is provided in the movable piece opening 78. FIGS. 5A-5B and FIGS. 6A-6B are used to describe the detail of the structure and the operation of the switch 44.

FIGS. 5A-5B are exploded top views showing mounting and removal of the first connector 32a in the storage battery unit 20. FIG. 5A shows a status occurring before the first connector 32a is mounted to the mounting port 54. The switch 44 is placed either at the position on the negative direction side along the y axis or at the position on the positive direction side along the y axis. It is assumed here that the switch 44 is turned off when it is placed at the position on the negative direction side along the y axis and is turned on when it is placed at the position on the positive direction side along the y axis. When the switch 44 is placed at the position on the negative direction side along the y axis, i.e., when the switch 44 is turned off, the end of the movable piece projection 76 provided on the positive direction side of the movable piece 74 along the y axis is positioned on the negative direction side along the y axis with respect to the hole 68. In this process, the movable piece projection 76 is not exposed in the mounting port 54 through the hole 68. This means that the movable piece projection 76 does not project from the second port surface 64 toward the positive direction side along the y axis. As described above, the switch 44 is turned off so that the unit power terminals 46 do not input and output a DC power when the movable piece projection 76 does not project from the second port surface 64.

FIG. 5B shows a case in which the switch 44 is placed at the position on the positive direction side along the y axis, i.e., the switch 44 is turned on, before the first connector 32a is mounted to the mounting port 54. In this process, the movable piece projection 76 is exposed in the mounting port 54 through the hole 68. This means that the movable piece projection 76 projects from the second port surface 64 toward the positive direction side along the y axis. Thus, the movable piece 74 is movable between the position in which the movable piece projection 76 projects from the second port surface 64 and the position in which the movable piece projection 76 does not project from the second port surface 64. As described above, the switch 44 is turned on so that the unit power terminals 46 input and output a DC power when the movable piece projection 76 projects from the second port surface 64. Meanwhile, as a result of the movable piece projection 76 projecting from the second port surface 64, the movable piece projection 76 interferes with the first connector 32a desired to be mounted to the mounting port 54. Therefore, the first connector 32a cannot be mounted to the mounting port 54. In other words, in the status in which the first connector 32a is being removed from the mounting port 54, it is impossible to mount the first connector 32a to the mounting port 54 while the unit power terminals 46 are inputting and outputting a DC power.

FIGS. 6A-6B are alternative exploded top views showing mounting and removal of the first connector 32a in the storage battery unit 20. FIG. 6A shows a case in which the first connector 32a is mounted to the mounting port 54 in a status in which the unit power terminals 46 are not inputting and outputting a DC power as in FIG. 5A. In a status in which the unit power terminals 46 are not inputting and outputting a DC power as in FIG. 5A, the movable piece projection 76 does not project from the second port surface 64 as in FIG. 5B so that the first connector 32a can be mounted to the mounting port 54. Mounting of the connector causes a connector recess 60 formed in the second connector surface 58 of the first connector 32a to be placed at the position facing the hole 68 of the second port surface 64. Mounting of the connector also connects the unit power terminals 46 and the connector power terminals 50 and connects the unit communication terminals 48 and the connector communication terminals 52. In other words, while the unit power terminals 46 are not inputting and outputting a DC power in the status in which the first connector 32a is being removed from the mounting port 54, the first connector 32a can be mounted to the mounting port 54.

FIG. 6B shows that the switch 44 is moved in the positive direction along the y axis from the position of FIG. 6A. The movement also moves the movable piece opening 78 and the movable piece 74 in the same direction. Since the hole 68 and the connector recess 60 communicate with each other as shown in FIG. 6A, the movable piece projection 76 moving in the positive direction along the y axis is inserted in the connector recess 60 via the hole 68. In other words, when the first connector 32a is mounted to the mounting port 54, the movable piece projection 76 can project from the second port surface 64 in the positive direction along the y axis until the movable piece projection 76 is set in the connector recess 60. In this process, the switch 44 is placed at the position on the positive direction side along the y axis so that the switch 44 is turned on. As a result, the unit power terminals 46 input and output a DC power.

When the first connector 32a is mounted to the mounting port 54 and the switch 44 is turned on as in FIG. 6B, the movable piece projection 76 is set in the connector recess 60 so that the first connector 32a cannot be moved backward. In other words, the first connector 32a cannot be removed from the mounting port 54 while the unit power terminals 46 are inputting and outputting a DC power. Meanwhile, by turning the switch 44 off to make a transition from FIG. 6B to FIG. 6A, the movable piece projection 76 is no longer set in the connector recess 60 so that the first connector 32a can be moved backward. In other words, the first connector 32a can be removed from the mounting port 54 while the unit power terminals 46 are not inputting and outputting a DC power.

According to this embodiment, the first connector 32a for connecting the unit power terminals 46 and the power converter 12 electrically is mounted to the mounting port 54 so that installation of the storage battery unit 20 is simplified. Further, the unit power terminals 46 and the connector power terminals 50 are connected by mounting the first connector 32a to the mounting port 54, an electrical work is made unnecessary. Further, while a DC power is being input and output in the status in which the first connector 32a is being removed from the mounting port 54, the first connector 32a cannot be mounted. The first connector 32a can be mounted while a DC power is not being input and output. Therefore, safety is secured. Further, since it is impossible, in the status in which the first connector 32a is being removed from the mounting port 54, to mount the first connector 32a while a DC power is being input and output, a spark is inhibited from being produced when the first connector 32a is mounted to the mounting port 54. Since a spark is inhibited from being produced, degradation of terminals is inhibited.

Further, while the unit power terminals 46 are inputting and outputting a DC power in the status in which the first connector 32a is being mounted to the mounting port 54, it is impossible to remove the first connector 32a from the mounting port 54. Therefore, safety is secured. Further, while the unit power terminals 46 are not inputting and outputting a DC power in the status in which the first connector 32a is being mounted to the mounting port 54, it is possible to remove the first connector 32a from the mounting port 54. Therefore, the first connector 32a can be removed safely.

Further, since a DC power is input and output when the movable piece 74 projects from the second port surface 64, it is made impossible to mount the first connector 32a to the mounting port 54 while a DC power is being input and output. Further, since a DC power is input and output when the movable piece 74 projects from the second port surface 64, is is made impossible to remove the first connector 32a from the mounting port 54 while a DC power is being input and output. Further, the housing of the first connector 32a is mounted to the mounting port 54 so that installation of the storage battery unit 20 is simplified.

Further, since it is not necessary to work with terminals during construction and installation of the storage battery unit 20 is simplified, the reliability of construction is improved. Further, since it is not necessary to work with terminals during construction and installation of the storage battery unit 20 is simplified, the labor hour is reduced. Further, since it is not necessary to work with terminals during construction and installation of the storage battery unit 20 is simplified, foreign materials are prevented from being mixed when the storage battery unit 20 is opened. Further, the first connector 32a cannot be removed while a power is being supplied to the unit power terminals 46. Therefore, the reliability of construction is secured.

One embodiment of the present disclosure is summarized below. A storage battery unit 20 according to an embodiment of the present disclosure includes: a storage battery 40; a unit power terminal 46 that inputs and outputs a DC power of the storage battery 40; and a mounting port 54 in which a first connector 32a is mounted, the first connector 32a being configured to electrically connect the unit power terminal 46 and an external power converter 12 for performing conversion between a DC power and an AC power, the first connector 32a also including a connector power terminal 50 connected to the unit power terminal 46. In a status in which the first connector 32a is being removed from the mounting port 54, it is impossible to mount the first connector 32a to the mounting port 54 while the unit power terminal 46 is inputting and outputting a DC power, and it is possible to mount the first connector 32a to the mounting port 54 while the unit power terminal 46 is not inputting and outputting a DC power.

In a status in which the first connector 32a is being mounted to the mounting port 54, it is impossible to remove the first connector 32a from the mounting port 54 while the unit power terminal 46 is inputting and outputting a DC power, and it is possible to remove the first connector 32a from the mounting port 54 while the unit power terminal 46 is not inputting and outputting a DC power.

The first connector 32a may include a first connector surface 56 on which the connector power terminal 50 is provided and a second connector surface 58 provided to the side of the first connector surface 56 and having a connector recess 60. The mounting port 54 may include: a first port surface 62 which faces the first connector surface 56 and on which the unit power terminal 46 is provided; and a second port surface 64 which faces the second connector surface 58. The storage battery unit may further comprise: a movable piece 74 movable between a position in which the movable piece 74 projects from the second port surface 64 and a position in which the movable piece does not project from the second port surface 64. When the first connector 32a is mounted to the mounting port 54, the movable piece 74 is set in the connector recess 60 when the movable piece 74 projects from the second port surface 64. The unit power terminal 46 inputs and outputs a DC power when the movable piece 74 projects from the second port surface 64, and the unit power terminal 46 does not input and output a DC power when the movable piece 74 does not project from the second port surface 64.

The first connector 32a electrically connects the storage battery unit 20 and an external power converter 12 for performing conversion between a DC power and an AC power, the first connector 32a including: a connector power terminal 50 connected to the unit power terminal 46; and a housing that houses the connector power terminal 50 and mounted to the mounting port 54.

Embodiment 2

A description will now be given of embodiment 2. Like embodiment 1, embodiment 2 relates to mounting and removal of the connector in the storage battery unit. In embodiment 1, a mechanism embodied by a movable piece is used to secure safety during mounting and removal of the connector. Meanwhile, embodiment 2 uses a switching mechanism. The following description concerns a difference from the foregoing.

Figure 7A:
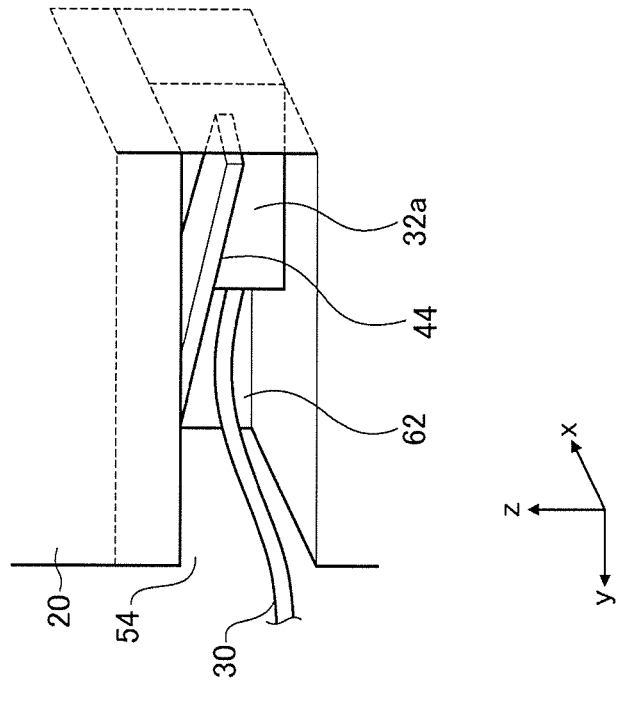
FIGS. 7A and 7B are perspective views showing mounting and removal of the first connector in the storage battery unit according to embodiment 2.
Figure 7B:
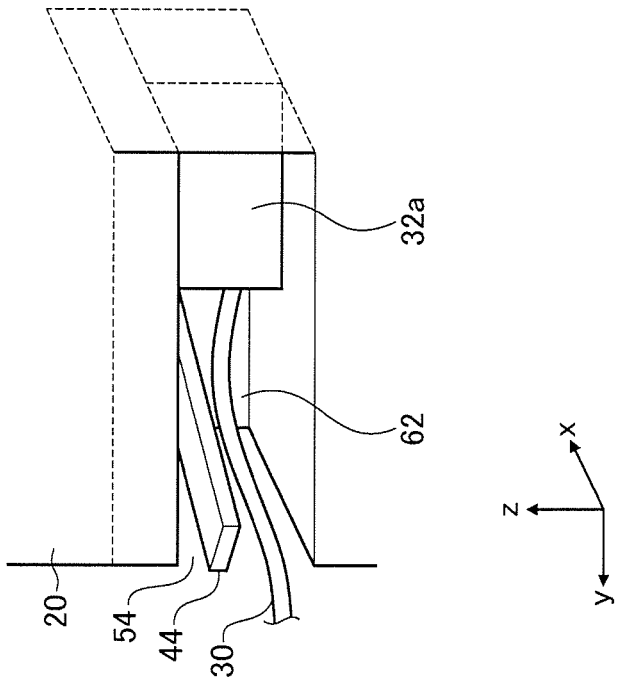

FIGS. 7A-7B are perspective views showing mounting and removal of the first connector 32a in the storage battery unit 20. These are rear perspective views showing the neighborhood of the mounting port 54 on an enlarged scale. The switch 44 is turned off when it is placed on the positive direction side along the y axis as shown in FIG. 7A and is turned on when it is placed on the negative direction side along the y axis as shown in FIG. 7B. Referring to FIG. 7A, a space of a size capable of guiding the first connector 32a is secured in a part of the mounting port 54 on the negative direction side of the switch 44 along the y axis. Therefore, it is possible to mount the first connector 32a to the mounting port 54 or remove the first connector 32a from the mounting port 54 by guiding the connector in this part. The unit power terminals 46 and the unit communication terminals 48 are provided in the part of the first port surface 62 shielded from view by the first connector 32a.

As in the foregoing embodiment, the unit power terminals 46 and the connector power terminals 50 are connected, and the unit communication terminals 48 and the connector communication terminals 52 are connected by mounting the first connector 32a to the mounting port 54. In other words, when the switch 44 is turned off, the first connector 32a can be mounted if it is being removed from the mounting port 54, and the first connector 32a can be removed if it is being mounted to the mounting port 54.

FIG. 7B shows that a part of mounting port 54 on the negative direction side of the switch 44 along the y axis is blocked in part by the switch 44. This prevents the first connector 32a from being guided in this part. This makes it impossible to mount the first connector 32a to the mounting port 54 or remove the first connector 32a from the mounting port 54. In other words, when the switch 44 is turned on, the first connector 32a cannot be mounted if it is being removed from the mounting port 54, and the first connector 32a cannot be removed if it is being mounted to the mounting port 54.

FIGS. 8A-8D are alternative perspective views showing mounting and removal of the first connector 32a in the storage battery unit 20. Like FIGS. 7A-7B, these are rear perspective views showing the neighborhood of the mounting port 54 on an enlarged scale. The storage battery unit 20, the switch 44, and the mounting port 54 are the same as those of FIGS. 7A-7B. FIG. 8A shows that the switch 44 is turned off, and the first connector 32a is removed from the mounting port 54. The first connector 32a has a box shape as described already but includes an insertion groove 130 and a movement guide groove 132 on the top surface thereof. Both the insertion groove 130 and the movement guide groove 132 are notches. The insertion groove 130 is provided at the position where the switch 44 in, the off state is placed, and the movement guide groove 132 is provided to extend from the position where the switch 44 in the off state is placed to the position where the switch 44 in the on state is placed.

FIG. 8B shows a case in which the first connector 32a is inserted into the mounting port 54 from behind the storage battery unit 20 while the switch 44 is being turned off. The position of the switch 44 and the position of the insertion groove 130 are aligned and the first connector 32a is pushed forward in the mounting port 54. FIG. 8C shows that the first connector 32a in the status of FIG. 8B has been pushed further and mounted to the mounting port 54. The switch 44 passes through the insertion groove 130 and is placed in the movement guide groove 132. Further, the unit power terminals 46 and the connector power terminals 50 are connected, and the unit communication terminals 48 and the connector communication terminals 52 are connected.

FIG. 8D shows that the switch 44 in the status of FIG. 8C has been switched from the off state to the on state. The switch 44 is moved in the movement guide groove 132 from the position on the positive direction side along the y axis to the position on the negative direction side along the y axis. As described above, when the switch 44 is turned off, it is possible to guide the switch 44 in the insertion groove 130 so that it is possible to mount the first connector 32a to the mounting port 54 or remove the first connector 32a from the mounting port 54. Meanwhile, when the switch 44 is turned on, it is impossible to guide the switch 44 in the insertion groove 130 so that it is impossible to mount the first connector 32a to the mounting port 54 or remove the first connector 32a from the mounting port 54.

Figure 9A:
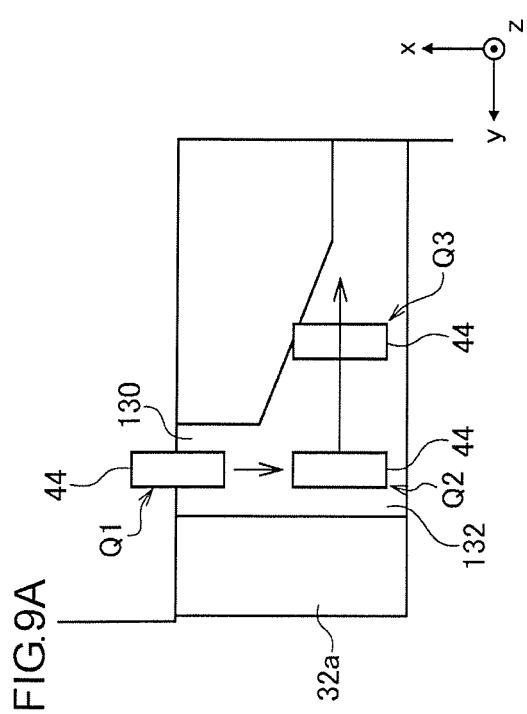
FIGS. 9A, 9B, and 9C show alternative exploded top views showing mounting and removal of the first connector in the storage battery unit according to embodiment 2.
Figure 9B:
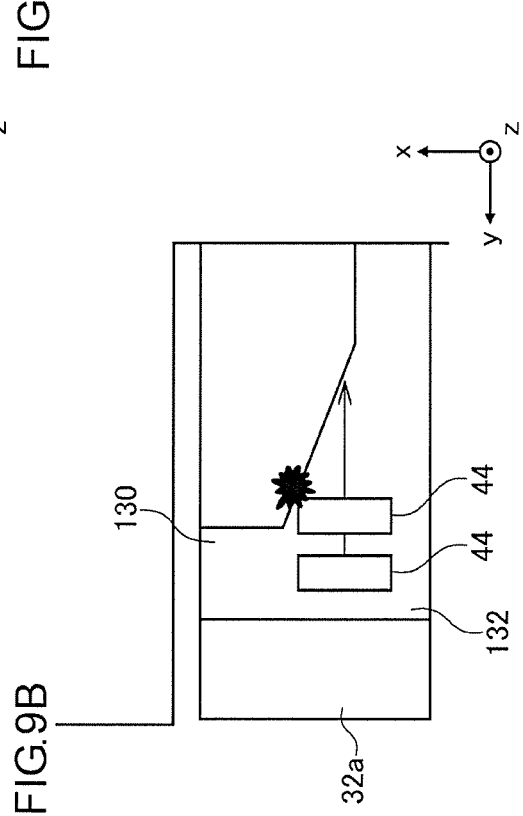
Figure 9C:
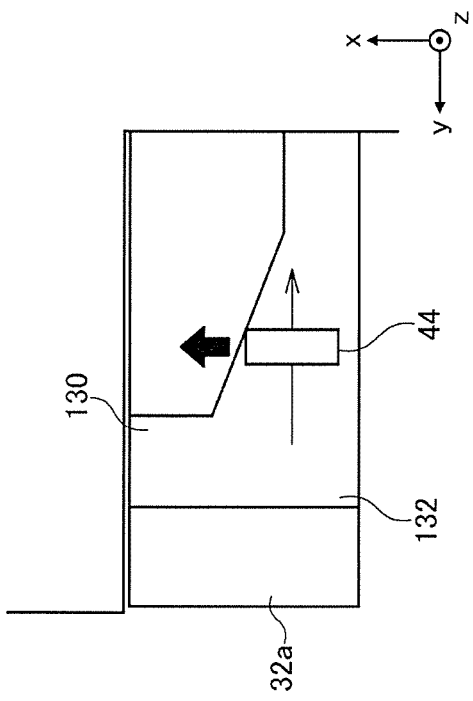

FIGS. 9A-9C are alternative exploded top views showing mounting and removal of the first connector 32a in the storage battery unit 20. FIG. 9A corresponds to FIGS. 8B-8D. As in the foregoing embodiment, the insertion groove 130 and the movement guide groove 132 are provided on the top surface of the first connector 32a. The switch 44 denoted by Q1 corresponds to the case of FIG. 8B, and the switch 44 denoted by Q2 corresponds to the case of FIG. 8C, and the switch 44 denoted by Q3 corresponds to the case of FIG. 8D.

FIG. 9B shows a case where the first connector 32a is accidentally inserted at an angle with respect to the mounting port 54. Even when the switch 44 is moved from the off position toward the on position, the switch 44 ends up hitting the wall. The wall is formed at an angle to extend from the insertion groove 130 toward the movement guide groove 132. FIG. 9C shows a case in which the switch 44 is moved further toward the on position from the status of FIG. 9B. A force that moves the wall forward is exerted at the point of contact between the switch 44 and the wall. As a result, the first connector 32a is properly inserted into the mounting port 54.

According to this embodiment, it is possible to mount the first connector 32a to the mounting port 54 when the switch 44 is turned off, and it is impossible to mount the first connector 32a to the mounting port 54 when the switch 44 is turned on. Therefore, mounting is disabled while a DC power is being input and output. Further, it is possible to remove the first connector 32a from the mounting port 54 when the switch 44 is turned off, and it is impossible to remove the first connector 32a from the mounting port 54 when the switch 44 is turned on. Therefore, removal is disabled while a DC power is being input and output.

One embodiment of the present disclosure is summarized below. The mounting port 54 may include a switch 44 for operating the storage battery 40. In a status in which the first connector 32a is being removed from the mounting port 54, it is possible to mount the first connector 32a to the mounting port 54 while the switch 44 is being turned off, and it is impossible to mount the first connector 32a to the mounting port 54 while the switch 44 is being turned on. In a status in which the first connector 32a is being mounted to the mounting port 54, it is possible to remove the first connector 32a from the mounting port 54 while the switch 44 is being turned off, and it is impossible to remove the first connector 32a from the mounting port 54 while the switch 44 is being turned on.

Embodiment 3

A description will now be given of embodiment 3. Like the foregoing embodiments, embodiment 3 relates to mounting and removal of the connector in the storage battery unit. The above description only concerns the relationship between the storage battery unit and the connector. Meanwhile, the relationship including other apparatus like the power converter will be described in embodiment 3. The following description concerns a difference from the foregoing embodiments.

Figure 10:
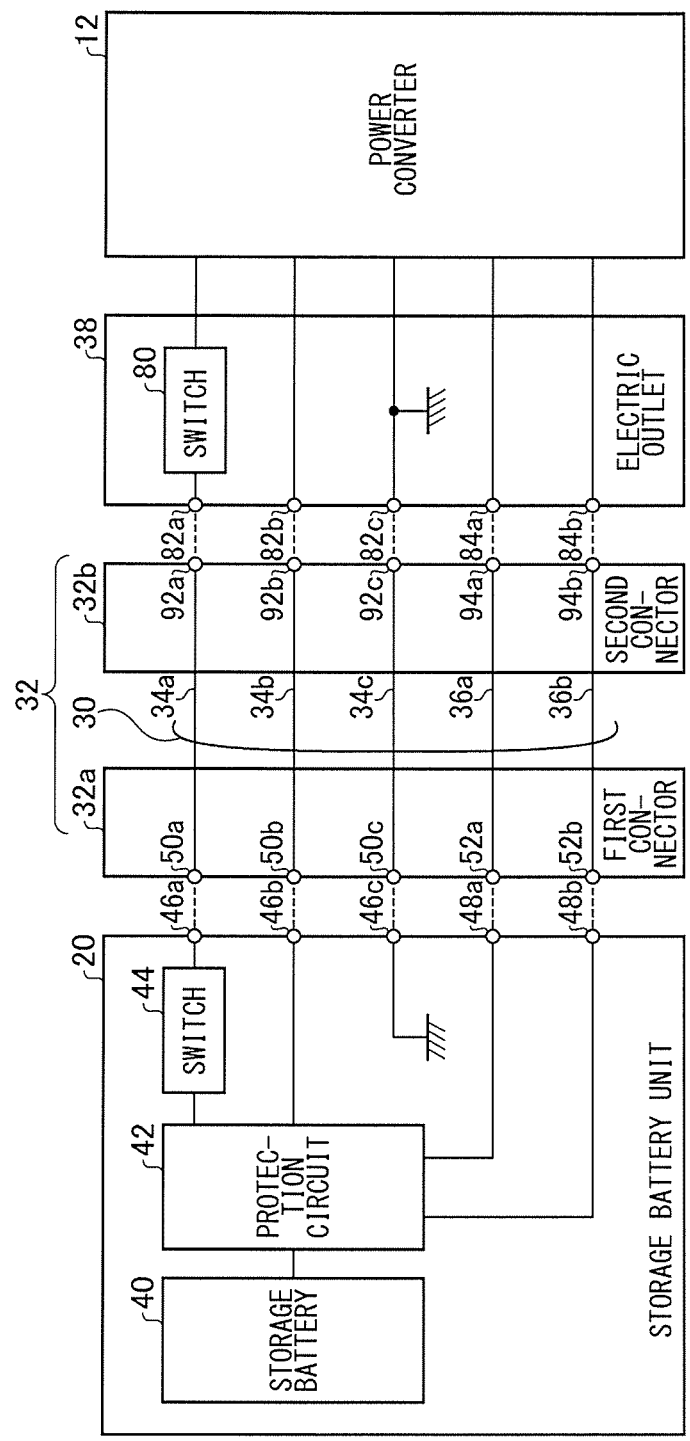
FIG. 10 shows wiring in the storage battery unit, the connector, an electric outlet, and the power converter according to embodiment 3.

FIG. 10 shows wiring in the storage battery unit 20, the connector 32, an electric outlet 38, and the power converter 12. The electric outlet 38 is included in addition to the components of FIG. 2. The electric outlet 38 includes a switch 80, a first electric outlet power terminal 82a, a second electric outlet power terminal 82b, a third electric outlet power terminal 82c, which are generically referred to as electric outlet power terminals 82, a first electric outlet communication terminal 84a, and a second electric outlet communication terminal 84b, which are generically referred to as electric outlet communication terminals 84. Further, the second connector 32b includes a first connector power terminal 92a, a second connector power terminal 92b, a third connector power terminal 92c, which are generically referred to as connector power terminals 92, a first connector communication terminal 94a, and a second connector communication terminal 94b, which are generically referred to as connector communication terminals 94.

The electric outlet 38 is provided between the second connector 32b and the power converter 12. For example, the electric outlet 38 is provided on a wall of a room of a facility in which the storage battery unit 20 is installed. When the second connector 32b is mounted to the electric outlet 38, the first connector power terminal 92a of the second connector 32b is connected to the first electric outlet power terminal 82a of the electric outlet 38. Similarly, the second connector power terminal 92b is connected to the second electric outlet power terminal 82b, and the third connector power terminal 92c is connected to the third electric outlet power terminal 82c. Further, the first connector communication terminal 94a is connected to the first electric outlet communication terminal 84a, and the second connector communication terminal 94b is connected to the second electric outlet communication terminal 84b. In this way, the second connector 32b can be connected to the power converter 12 via the electric outlet 38.

The structure related to the connection between the electric outlet power terminals 82 of the electric outlet 38 and the connector power terminals 92 of the second connector 32b is the same as the structure related to the connection between the unit power terminals 46 of the storage battery unit 20 and the connector power terminals 50 of the first connector 32a. Further, the structure related to the connection between the electric outlet communication terminals 84 of the electric outlet 38 and the connector communication terminals 94 of the second connector 32b is similar to the structure related to the connection between the unit communication terminals 48 of the storage battery unit 20 and the connector communication terminals 52 of the first connector 32a. Further, the switch 80 of the electric outlet 38 is similar to the switch 44 of the storage battery unit 20.

Therefore, the unit power terminals 46 can input and output a DC power when the second connector 32b is connected to the electric outlet power terminals 82 and the electric outlet communication terminals 84 of the electric outlet 38. Meanwhile, the unit power terminals 46 cannot input and output a DC power when the second connector 32b is not connected to the electric outlet power terminals 82 and the electric outlet communication terminals 84 of the electric outlet 38.

Figure 11:
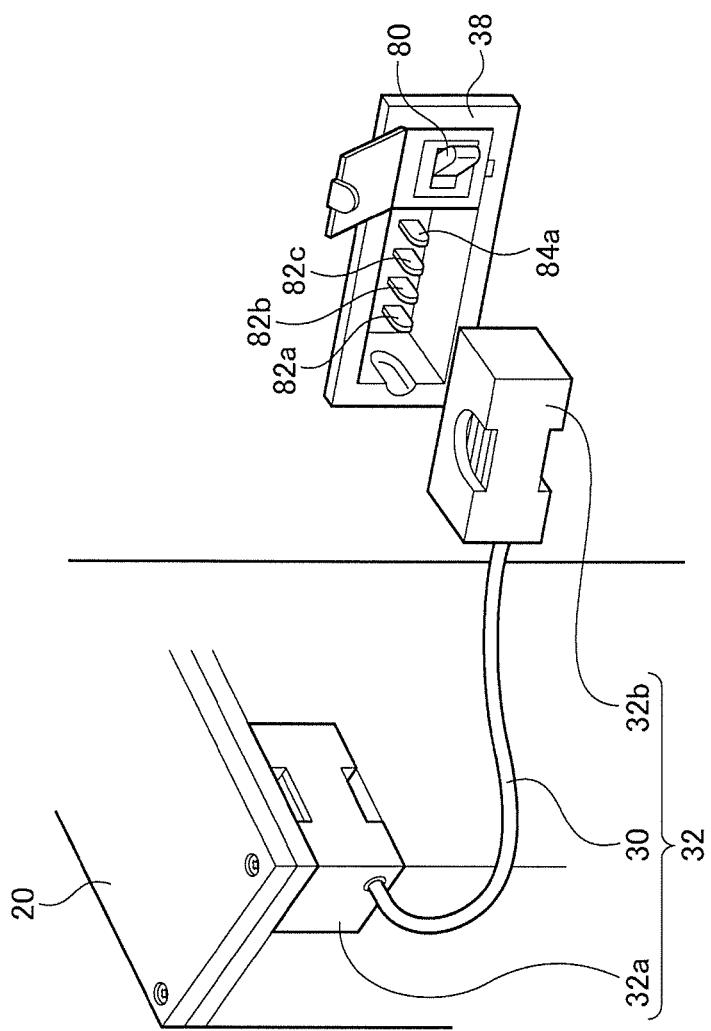
FIG. 11 shows a structure of the storage battery unit, the connector, and the electric outlet of FIG. 10.

FIG. 11 shows a structure of the storage battery unit 20, the connector 32, and the electric outlet 38. As illustrated, the second connector 32b can be mounted to the electric outlet 38. The electric outlet power terminals 82, the electric outlet communication terminals 84, etc. are provided in the mounting part. Also, the switch 80 is provided beside the mounting part. The structure of the electric outlet 38 may be provided in the power converter 12.

Figure 12:
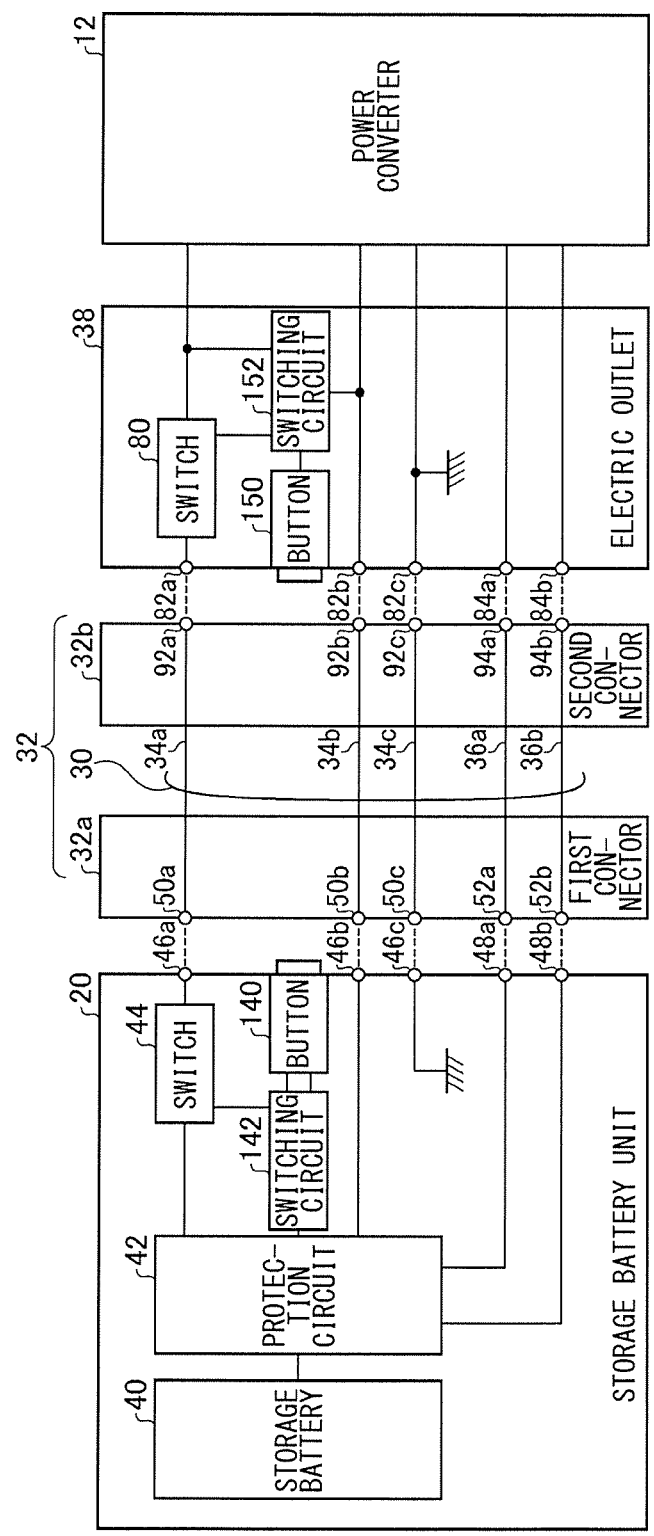
FIG. 12 shows alternative wiring in the storage battery unit, the connector, the electric outlet, and the power converter according to embodiment 3.

FIG. 12 shows alternative wiring in the storage battery unit 20, the connector 32, the electric outlet 38, and the power converter 12. In addition to the components in FIG. 10, the storage battery unit 20 includes a button 140 and a switching circuit 142, and the electric outlet 38 includes a button 150 and a switching circuit 152. In the foregoing embodiments, the unit power terminals 46 are described as inputting and outputting a DC power when the switch 44 is turned on. A description will be given of a configuration in which the unit power terminals 46 do not input and output a DC power merely because the switch 44 is turned on. The button 140 is pressed down when the unit power terminals 46 are allowed to input and output a DC power. When the switch 44 is turned on and the button 140 is pressed down, the switching circuit 142 controls the unit power terminals 46 to input and output a DC power. Meanwhile, the switching circuit 142 controls the unit power terminals 46 not to input and output a DC power otherwise. The button 150 and the switching circuit 152 operate in a manner similar to that of the button 140 and the switching circuit 142.

Figure 13:
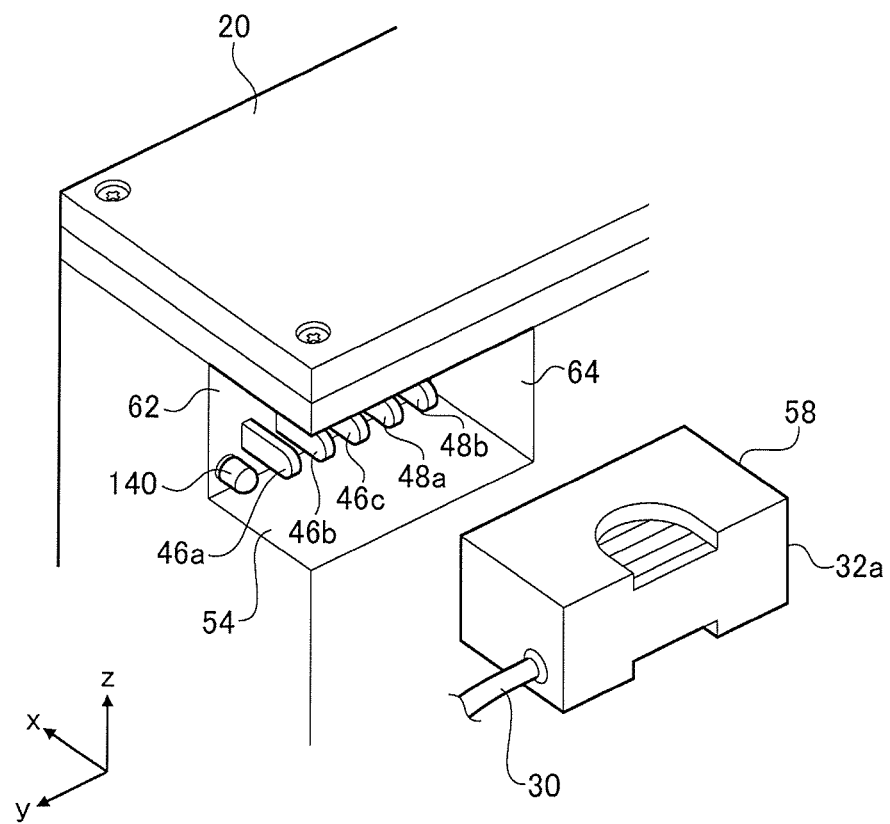
FIG. 13 is a perspective view showing a structure of the storage battery unit and the first connector of FIG. 12.

FIG. 13 is a perspective view showing a structure of the storage battery unit 20 and the first connector 32a. FIG. 13 is an illustration similar to FIG. 4B. The button 140 is provided on the first port surface 62 on the positive direction side of the first unit power terminal 46a along the y axis. When the first connector 32a is mounted to the mounting port 54, the button 140 is pressed down by the first connector 32a. The button 150 has a similar structure.

According to the embodiment, since a DC power cannot be input and output when the second connector 32b is not connected to the electric outlet 38, safety is secured. Further, since a DC power can be input and output when the second connector 32b is connected to the electric outlet 38, safety is secured. Further, since a DC power can be input and output when the switch 44 is turned on and the button 140 is pressed down, safety is secured. Further, since a DC power can be input and output when the switch 80 is turned on and the button 150 is pressed down, safety is secured. Further, since the storage battery unit 20 and the electric outlet 38 are connected by the connector 32, the storage battery unit 20 and the power converter 12 can be installed in separate rooms. Further, since the storage battery unit 20 and the power converter 12 can be installed in separate rooms, the flexibility of layout is improved.

Described above is an explanation based on an exemplary embodiment. The embodiment is intended to be illustrative only and it will be understood by those skilled in the art that various modifications to constituting elements and processes could be developed and that such modifications are also within the scope of the present disclosure.

Arbitrary combinations of embodiments 1 through 3 are also useful. According to this variation, the advantage of the arbitrary combinations of embodiments 1 through 3 is obtained.

The connector 32 is shown as including the first connector 32a, the second connector 32b, and the cable 30 by way of one example, but the cable 30 need not necessarily be provided.

Further, finger protection may be provided in the terminals. According to this variation, safety is further improved.

The invention claimed is:

1. A storage battery unit comprising:
   a storage battery;
   a unit power terminal that inputs and outputs a DC power of the storage battery; and
   a mounting port in which a connector is mounted, the connector being configured to electrically connect the unit power terminal and an external power converter for performing conversion between a DC power and an AC power, the connector also including a connector power terminal connected to the unit power terminal,
   wherein in a status in which the connector is being removed from the mounting port, it is impossible to mount the connector to the mounting port while the unit power terminal is enabled to input and output a DC power, and it is possible to mount the connector to the mounting port while the unit power terminal is not inputting and outputting a DC power,
   wherein the connector includes a first connector surface on which the connector power terminal is provided and a second connector surface provided to a side of the first connector surface and having a connector recess,
   wherein the mounting port includes:
      a first port surface which faces the first connector surface and on which the unit power terminal is provided; and
      a second port surface which faces the second connector surface,
   wherein the storage battery unit further comprises a movable piece movable between a position in which the movable piece projects from the second port surface and a position in which the movable piece does not project from the second port surface,
   wherein when the connector is mounted to the mounting port, the movable piece is set in the connector recess when the movable piece projects from the second port surface, and
   wherein the unit power terminal inputs and outputs a DC power when the movable piece projects from the second port surface, and the unit power terminal does not input and output a DC power when the movable piece does not project from the second port surface.

2. A storage battery unit comprising:
   a storage battery;
   a unit power terminal that inputs and outputs a DC power of the storage battery; and
   a mounting port in which a connector is mounted, the connector being configured to electrically connect the unit power terminal and an external power converter for performing conversion between a DC power and an AC power, the connector also including a connector power terminal connected to the unit power terminal,
   wherein in a status in which the connector is being removed from the mounting port, it is impossible to mount the connector to the mounting port while the unit power terminal is enabled to input and output a DC power, and it is possible to mount the connector to the mounting port while the unit power terminal is not inputting and outputting a DC power,
   wherein the mounting port includes a switch for operating the storage battery, wherein in a status in which the connector is being removed from the mounting port, it is possible to mount the connector to the mounting port while the switch is being turned off, and it is impossible to mount the connector to the mounting port while the switch is being turned on, and wherein in a status in which the connector is being mounted to the mounting port, it is possible to remove the connector from the mounting port while the switch is being turned off, and it is impossible to remove the connector from the mounting port while the switch is being turned on.

3. A connector for electrically connecting the storage battery unit according to claim 1 and an external power converter for performing conversion between a DC power and an AC power, the connector comprising:
- a connector power terminal connected to the unit power terminal; and
- a housing that houses the connector power terminal and mounted to the mounting port.

4. A connector for electrically connecting the storage battery unit according to claim 2 and an external power converter for performing conversion between a DC power and an AC power, the connector comprising:
- a connector power terminal connected to the unit power terminal; and
- a housing that houses the connector power terminal and mounted to the mounting port.

\* \* \* \* \*